US011816389B2

(12) United States Patent
Gossain

(10) Patent No.: US 11,816,389 B2
(45) Date of Patent: *Nov. 14, 2023

(54) COMMUNICATION BASED ON OPERATION MODE

(71) Applicant: Sonos, Inc., Santa Barbara, CA (US)

(72) Inventor: Hrishikesh Gossain, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 480 days.

This patent is subject to a terminal disclaimer.

(21) Appl. No.: 17/102,024

(22) Filed: Nov. 23, 2020

(65) Prior Publication Data

US 2021/0216270 A1 Jul. 15, 2021

Related U.S. Application Data

(63) Continuation of application No. 16/441,963, filed on Jun. 14, 2019, now Pat. No. 10,846,049, which is a (Continued)

(51) Int. Cl.
*G06F 3/16* (2006.01)
*H04W 52/02* (2009.01)
(Continued)

(52) U.S. Cl.
CPC .............. *G06F 3/165* (2013.01); *G05B 15/02* (2013.01); *G06F 1/3203* (2013.01); *H04L 45/22* (2013.01);
(Continued)

(58) Field of Classification Search
CPC ....... G06F 3/165; G06F 1/3203; G05B 15/02; H04L 45/22; H04L 65/403;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.
(Continued)

*Primary Examiner* — Phung-Hoang J Nguyen

(57) ABSTRACT

Embodiments are provided for utilizing communication routes based operation mode. In an example implementation, while operating in a normal power mode, a playback device maintains information in a network table, the information includes first information associated with a second playback device of the networked media system and second information associated with a third playback device of the networked media system. The playback device determines that the first playback device is to enter a low power mode to draw less power from a battery of the first playback device relative to the normal power mode, and responsive to the determination, foregoing maintaining of the second information in the network table. Thereafter, the playback device determines that the first playback device is to return to normal power mode; and, and in response, synchronizes with the second playback device based at least in part on the first information for playback of audio content.

19 Claims, 14 Drawing Sheets

Related U.S. Application Data continuation of application No. 15/973,267, filed on May 7, 2018, now Pat. No. 10,324,685, which is a continuation of application No. 14/994,316, filed on Jan. 13, 2016, now Pat. No. 9,965,242, which is a continuation of application No. 14/040,897, filed on Sep. 30, 2013, now Pat. No. 9,298,244.

(51) Int. Cl.

| | | |
|---|---|---|
| *G06F 1/3203* | (2019.01) | |
| *H04W 52/46* | (2009.01) | |
| *H04W 40/02* | (2009.01) | |
| *H04L 45/00* | (2022.01) | |
| *G05B 15/02* | (2006.01) | |
| *H04W 84/18* | (2009.01) | |

(52) U.S. Cl.
CPC ....... *H04W 40/02* (2013.01); *H04W 52/0212* (2013.01); *H04W 52/0219* (2013.01); *H04W 52/0251* (2013.01); *H04W 52/46* (2013.01); *H04W 84/18* (2013.01); *Y02D 30/70* (2020.08)

(58) Field of Classification Search
CPC ............. H04L 65/1069; H04L 65/1063; H04L 12/1818; H04L 51/063; H04W 40/02; H04W 52/0212; H04W 52/0219; H04W 52/0251; H04W 52/46; H04W 84/18; Y02D 30/70; H04N 7/15
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,317,789 | B1 | 11/2001 | Rakavy et al. |
| 6,366,582 | B1 | 4/2002 | Nishikado et al. |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 6,801,529 | B1 | 10/2004 | McGrane et al. |
| 6,836,788 | B2 | 12/2004 | Kim et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,324,857 | B2 | 1/2008 | Goddard |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,668,925 | B1 | 2/2010 | Liao et al. |
| 7,853,341 | B2 | 12/2010 | McCarty et al. |
| 7,949,727 | B2 | 5/2011 | Jensen |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,538,564 | B2 | 9/2013 | Almstrand et al. |
| 8,572,224 | B2 | 10/2013 | Hite et al. |
| 8,942,252 | B2 | 1/2015 | Balassanian et al. |
| 9,179,197 | B2 * | 11/2015 | Beckhardt .......... H04N 21/6408 |
| 9,521,074 | B2 * | 12/2016 | Peters ..................... H04L 45/48 |
| 10,324,685 | B2 | 6/2019 | Gossain |
| 11,153,307 | B1 * | 10/2021 | Davey ................. H04L 63/0853 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2003/0195964 | A1 | 10/2003 | Mane |
| 2004/0024478 | A1 | 2/2004 | Hans et al. |
| 2005/0044431 | A1 | 2/2005 | Lang et al. |
| 2005/0135304 | A1 | 6/2005 | Wentink et al. |
| 2006/0209745 | A1 | 9/2006 | MacMullan et al. |
| 2006/0209785 | A1 | 9/2006 | Iovanna et al. |
| 2006/0253735 | A1 | 11/2006 | Kwak et al. |
| 2006/0259642 | A1 | 11/2006 | Du et al. |
| 2007/0076649 | A1 | 4/2007 | Lin et al. |
| 2007/0136522 | A1 | 6/2007 | Umemura et al. |
| 2007/0142944 | A1 | 6/2007 | Goldberg et al. |
| 2009/0077405 | A1 | 3/2009 | Johansen |
| 2010/0067595 | A1 | 3/2010 | Feher |
| 2010/0315997 | A1 | 12/2010 | Kim |
| 2011/0116413 | A1 | 5/2011 | Arai |
| 2012/0246353 | A1 | 9/2012 | Lim |
| 2013/0051251 | A1 | 2/2013 | Wang et al. |
| 2013/0054863 | A1 | 2/2013 | Imes et al. |
| 2013/0250825 | A1 | 9/2013 | Gosal et al. |
| 2014/0163978 | A1 | 6/2014 | Basye et al. |
| 2014/0254349 | A1 | 9/2014 | Jia et al. |
| 2016/0359661 | A1 | 12/2016 | Chhabra et al. |

OTHER PUBLICATIONS

AudioTron Reference Manual, Version 3.0, May 2002, 70 pages.
AudioTron Setup Guide, Version 3.0, May 2002, 38 pages.
Benslimane Abderrahim, "A Multimedia Synchronization Protocol for Multicast Groups," Proceedings of the 26th Euromicro Conference, 2000, pp. 456-463, vol. 1.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowance dated Apr. 2, 2018, issued in connection with U.S. Appl. No. 14/994,316, filed Jan. 13, 2016, 4 pages.
Decker et al., "RFC 1493, Definitions of Managed Objects for Bridges," Network Working Group, Jul. 1993, 35 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Aug. 14, 2017, issued in connection with U.S. Appl. No. 14/99316, filed Jan. 13, 2016, 13 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
Ishibashi et al., "A Group Synchronization Mechanism for Live Media in Multicast Communications," IEEE Global Telecommunications Conference, 1997, pp. 746-752, vol. 2.
Ishibashi et al., "A Group Synchronization Mechanism for Stored Media in Multicast Communications," IEEE Information Revolution and Communications, 1997, pp. 692-700, vol. 2.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Levi et al., Request for Comments 4318, Definitions of Managed Objects for Bridges with Rapid Spanning Tree Protocol, Dec. 2005,14 pages.
Louderback, Jim, "Affordable Audio Receiver Furnishes Homes With MP3," TechTV Vault. Jun. 28, 2000 retrieved Jul. 10, 2014, 2 pages.

(56) References Cited

OTHER PUBLICATIONS

Non-Final Office Action dated Feb. 7, 2017, issued in connection with U.S. Appl. No. 14/994,316, filed Jan. 13, 2016, 14 pages.
Non-Final Office Action dated Mar. 18, 2020, issued in connection with U.S. Appl. No. 16/441,963, filed Jun. 14, 2019, 18 pages.
Non-Final Office Action dated Aug. 6, 2018, issued in connection with U.S. Appl. No. 15/973,267, filed May 7, 2018, 10 pages.
Notice of Allowance dated Nov. 19, 2015, issued in connection with U.S. Appl. No. 14/040,897, filed Sep. 30, 2013, 9 pages.
Notice of Allowance dated Jan. 17, 2018, issued in connection with U.S. Appl. No. 14/994,316, filed Jan. 13, 2016, 7 pages.
Notice of Allowance dated Feb. 4, 2019, issued in connection with U.S. Appl. No. 15/973,267, filed May 7, 2018, 5 pages.
Palm, Inc., "Handbook for the Palm VII Handheld," May 2000, 311 pages.
Park et al., "Group Synchronization in MultiCast Media Communications," Proceedings of the 5th Research on Multicast Technology Workshop, 2003, 5 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

| Bridge Table Entry 1102 | | |
|---|---|---|
| Port ID | Port_928 | Port_932 |
| MAC Address | Playback_906 | Playback_910 |
| Route Type | Direct | STP |
| Port Type | P2P (Wireless) | P2P (Wireless) |

FIGURE 11A

| Bridge Table Entry 1104 | | |
|---|---|---|
| Port ID | Null | Port_932 |
| MAC Address | Null | Playback_910 |
| Route Type | Null | STP |
| Port Type | Null | P2P (Wireless) |

FIGURE 11B

| Bridge Table Entry 1106 | | | | |
|---|---|---|---|---|
| Port ID | Port_924 | Port_926 | Port_928 | Port_920 |
| MAC Address | Playback_908 | Playback_910 | Playback_912 | Null |
| Route Type | STP | Direct | Direct | STP |
| Port Type | P2P (Wireless) | P2P (Wireless) | P2P (Wireless) | WIRED |

FIGURE 11C

| Bridge Table Entry 1108 | | | | |
|---|---|---|---|---|
| Port ID | Port_924 | Null | Null | Port_920 |
| MAC Address | Playback_908 | Null | Null | Null |
| Route Type | STP | Null | Null | STP |
| Port Type | P2P (Wireless) | Null | Null | WIRED |

FIGURE 11D

Bridge Table Entry 1242

| Port ID | Port_1220 | Port_1240 |
|---|---|---|
| MAC Address | Wireless_1204 | Playback_1208 |
| Route Type | "Access Point" | Direct |
| Port Type | AP (Wireless) | P2P (Wireless) |

FIGURE 12B

Bridge Table Entry 1244

| Port ID | Port_1220 | Null |
|---|---|---|
| MAC Address | Wireless_1204 | Null |
| Route Type | "Access Point" | Null |
| Port Type | AP (Wireless) | Null |

COMMUNICATION BASED ON OPERATION MODE

CROSS REFERENCE TO RELATED APPLICATIONS

This application claims priority under 35 U.S.C. § 120 to, and is a continuation of, U.S. non-provisional patent application Ser. No. 16/441,963, filed on Jun. 14, 2019, entitled "Communication Based On Operation Mode," which is incorporated herein by reference in its entirety.

U.S. non-provisional patent application Ser. No. 16/441,963 claims priority under 35 U.S.C. § 120 to, and is a continuation of, U.S. non-provisional patent application Ser. No. 15/973,267, filed on May 7, 2018, entitled "Communication Based On Operation Mode," and issued as U.S. Pat. No. 120,324,685 on Jun. 18, 2019, which is incorporated herein by reference in its entirety.

U.S. non-provisional patent application Ser. No. 15/973,267 claims priority under 35 U.S.C. § 120 to, and is a continuation of, U.S. non-provisional patent application Ser. No. 14/994,316, filed on Jan. 13, 2016, entitled "Communication Based On Operation Mode," and issued as U.S. Pat. No. 9,965,242 on May 8, 2018 which is incorporated herein by reference in its entirety.

U.S. non-provisional patent application Ser. No. 14/994,316 claims priority under 35 U.S.C. § 120 to, and is a continuation of, U.S. non-provisional patent application Ser. No. 14/040,897, filed on Sep. 30, 2013, entitled "Communication Routes Based On Low Power Operation," and issued as U.S. Pat. No. 9,298,244 on Mar. 29, 2016, which is also incorporated herein by reference in its entirety.

FIELD OF THE DISCLOSURE

The disclosure is related to consumer goods and electronics, personal area networks (PANs), wireless connectivity protocols, human interface devices (HID), personal computer (PC) devices, and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to manage or play digital music, like digital music files or even Internet radio, in the home through the use of their computer or similar devices. Now there are many different ways to manage or play digital music, in addition to other digital content including digital video and photos, stimulated in many ways by high-speed Internet access at home, mobile broadband Internet access, and consumer demand for digital media.

Until recently, options for managing and playing digital audio in multiple different settings were severely limited. In 2005, Sonos offered for sale its first digital audio system that enabled people to, among many other things, access virtually unlimited sources of audio via one or more networked connected media players, dynamically group or ungroup media players upon command, wirelessly send the audio over a local network amongst media players, and play the digital audio out loud across multiple media players in synchrony. The Sonos system can be controlled by software applications running on network capable mobile devices and computers.

Given the growing consumer demand for digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

FIG. 11A shows an illustration of an example bridge table entry;

FIG. 11B shows an illustration of an example bridge table entry based on low power operation;

FIG. 11C shows an illustration of another example bridge table entry;

FIG. 11D shows an illustration of another example bridge table entry based on low power operation;

FIG. 12B shows an illustration of yet another example bridge table entry;

FIG. 12C shows an illustration of yet another example bridge table entry based on low power operation;

Figure 1:
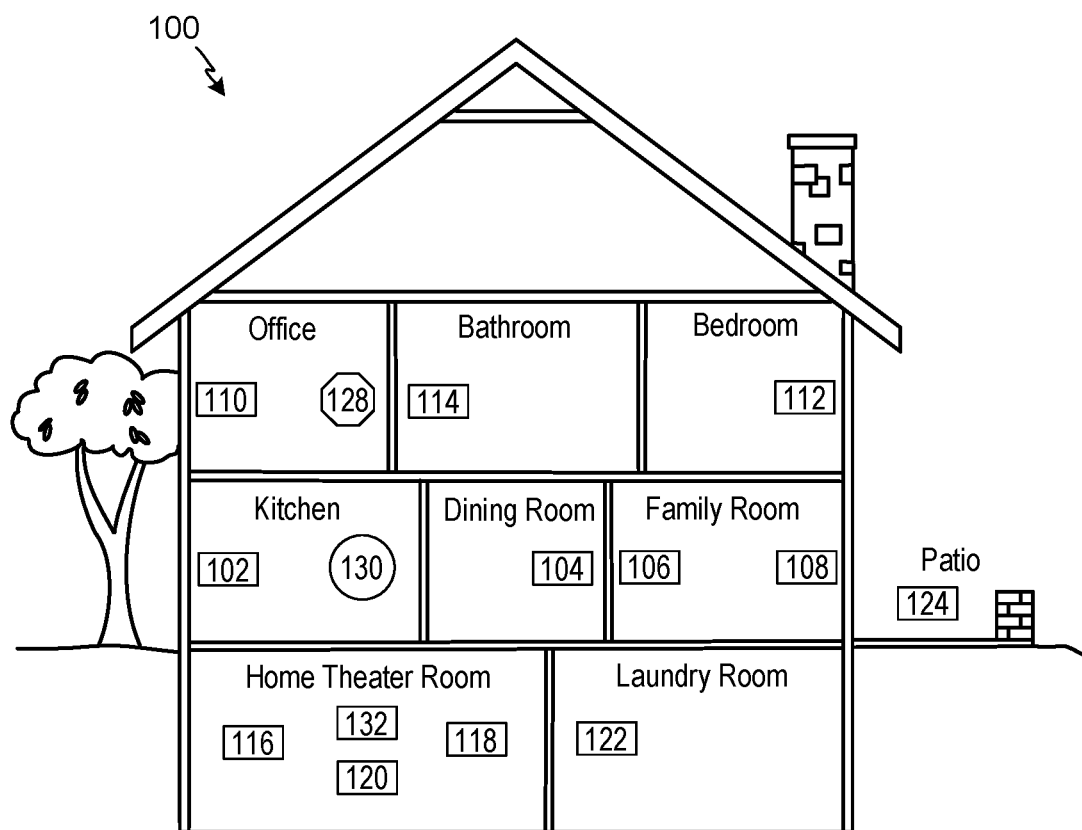
FIG. 1 shows an example configuration in which certain embodiments may be practiced.

In addition, the drawings are for the purpose of illustrating example embodiments, but it is understood that this application is not limited to the arrangements and instrumentality shown in the drawings.

DETAILED DESCRIPTION

I. Overview

Embodiments described herein involve communication routes between multimedia playback devices of a networked media system, e.g., a home entertainment system. In some embodiments, communication routes of the networked media system may enable playback devices in a home or "household" to communicate with one another in a mesh network. In other embodiments, communication routes of the networked media system may enable playback devices in a home or "household" to communicate with one another in a star network, such as through an access point (AP) or router. In some instances, a first playback device of a network media system may be configured to communicate with a second playback device through a direct communication route and/or a non-direct communication route. For example, the first playback device may be configured to utilize a direct communication route by communicating directly with the second playback device. Alternatively, the first playback device may be configured to utilize a non-direct communication route. For example, the first playback device may send data destined for the second playback device (i.e., the destination device) through a third device (i.e., an intermediary device). In some embodiments, the third device is a playback device. In other embodiments, the third device is an access point.

In some embodiments, non-direct routing may be beneficial. For example, conventional protocols generally utilize non-direct communication routes to prevent routing loops and/or errors in routing algorithms. However, a drawback to such non-direct routing is the possibility of "triangular routing." In some instances, such protocols associated with non-direct routing may cause direct routes to be blocked, whereas direct routes may provide a number of advantages as well. For example, considering the scenario above, direct routes may enable the first playback device to bypass indirect forwarding routes through the third device, i.e., triangular routing, thereby transmitting data straight to the second playback device efficiently and with less congestion.

Thus, embodiments described herein may utilize both direct routes and non-direct routes, in accordance with various types of device modes, e.g., a low power mode. In some instances, a playback device may be a battery-powered device that supports a low power mode. To conserve battery power in such low power modes, the number of direct routes in a networked media system may be reduced. For example, considering the scenarios above, the first playback device operating in a normal-operating mode may change to a low power device mode. Based on changing to this low power mode, the first playback device may stop using direct routes and alternatively utilize non-direct routes to communicate with the second playback device. As such, the first playback device may eliminate direct routes with the second playback device and facilitate its conservation of battery power and energy. In particular, eliminating direct routes may reduce the number of wireless interfaces utilized by the first playback device. In addition, eliminating direct routes may free the first playback device from having to update communication data, e.g., bridge tables, address information, and forwarding tables, among other forms of data.

As indicated above, the present application involves utilizing direct and non-direct communication routes based on one or more playback devices entering a low power mode. In one aspect, a method is provided. The method involves determining, by a first playback device, that the first playback device should enter a low power mode, where the first playback device is part of a networked media system. Based on this determination, the method further involves identifying, by the first playback device, at least one additional playback device that is part of the networked media system, where the first playback device is configured to communicate with the at least one additional playback device via (i) a first route, and (ii) a second route. Further, the method involves informing, by the first playback device, the at least one additional playback device not to utilize the first route with the first playback device. Yet further, the method involves entering, by the first playback device, the low power mode. While the first playback device is in the low power mode, the method further involves periodically receiving, by the first playback device, a message from a master device, where the master device is part of the networked media system. Based on the message, the method involves exiting, by the first playback device, the low power mode.

In another aspect, a playback device is provided. The playback device includes a processor, a network interface, a non-transitory computer-readable storage medium, and program logic stored on the non-transitory computer-readable medium. The program logic is executable by the processor to determine that the playback device should enter a low power mode, where the playback device is part of a networked media system. Based on the determination, the program logic is further executable by the processor to identify at least one additional playback device that is part of the networked media system, where the playback device is configured to communicate with the at least one additional playback device via (i) a first route, and (ii) a second route. The program logic is further executable by the processor to inform the at least one additional playback device not to utilize the first route with the playback device. Yet further, the program logic is executable by the processor to enter the low power mode. While the first playback device is in the low power mode, the program logic is further executable by the processor to periodically receive a message from a master device, where the master device is part of the networked media system. Based on the message, the program logic is further executable by the processor to exit the low power mode.

In yet another aspect, a non-transitory computer-readable storage medium is provided. The non-transitory computer-readable storage medium includes a set of instructions for execution by a processor. The set of instructions, when executed, cause a playback device to determine that the playback device should enter a low power mode, where the playback device is part of a networked media system. Based on the determination, the set of instructions, when executed, cause the playback device to identify at least one additional playback device that is part of the networked media system, where the playback device is configured to communicate with the at least one additional playback device via (i) a first route, and (ii) a second route. Further, the set of instructions, when executed, cause the playback device to inform the at least one additional playback device not to utilize the first route with the playback device. Further, the set of instructions, when executed, cause the playback device to enter the low power mode. While the first playback device is in the low power mode, the set of instructions, when executed, cause the playback device to periodically receive a message from a master device, where the master device is part of the networked media system. Based on the message, the set of instructions, when executed, cause the playback device to exit the low power mode.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented. It should be noted that media system configuration 100 may also be referred to a networked media system including one or more playback devices, e.g., zone players.

By way of illustration, the media system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. Zone players 102-124, also referred to herein as playback devices, multimedia units, speakers, players, and so on, provide audio, video, and/or audiovisual outputs. A controller 130 (e.g., shown in the kitchen for purposes of example and explanation) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
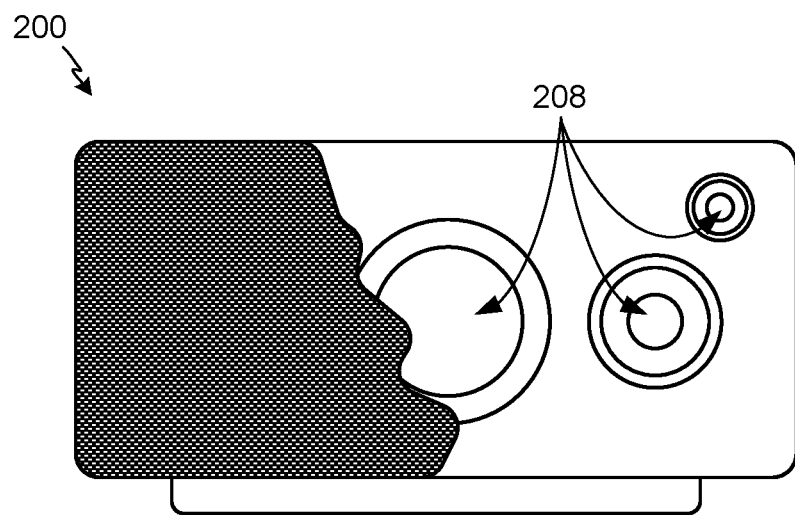
FIG. 2A shows an illustration of an example zone player having a built-in amplifier and transducers.
Figure 2B:
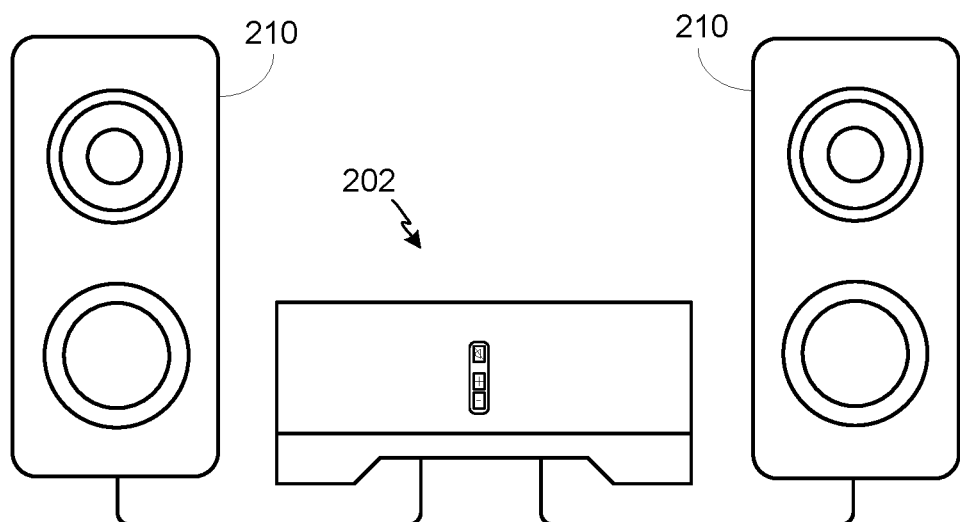
FIG. 2B shows an illustration of an example zone player having a built-in amplifier and connected to external speakers.
Figure 2C:
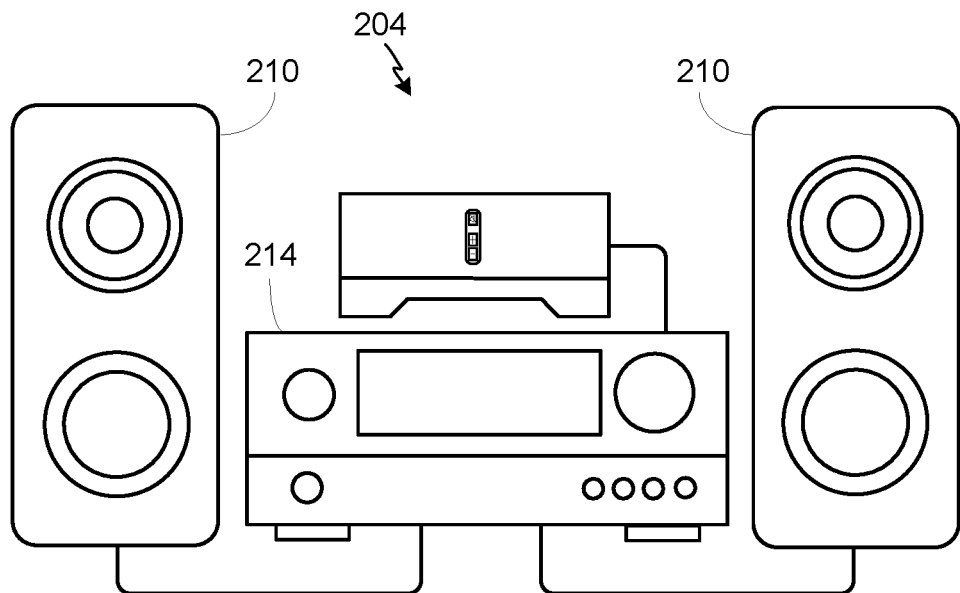
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, each of zone players 200-204 may also be referred to as a "smart speaker," because each zone player contains processing capabilities beyond the reproduction of audio, more of which is described below.

FIG. 2A illustrates a zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the media content received by zone player 200 is less than full-range.

FIG. 2B illustrates zone player 202 that includes a built-in amplifier to power and amplify sound to a set of detached speakers 210. A detached speaker can include, for example, any type of loudspeaker. Zone player 202 may be configured to power one or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or simply a "queue"). The playback queue generally contains information corresponding to one or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction or play, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, radio station name, playlist, and/or other some other representation or identification. A user can populate the playback queue with audio items of interest. The user may also modify and clear the playback queue, if so desired, such that the queue may be empty.

By way of illustration, SONOS, Inc. of Santa Barbara, California presently offers for sale zone players referred to as a "PLAY:5," "PLAY:3," "PLAYBAR," "CONNECT: AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar devices capable of storing and playing video and audio files.

b. Example Controllers

Figure 3:
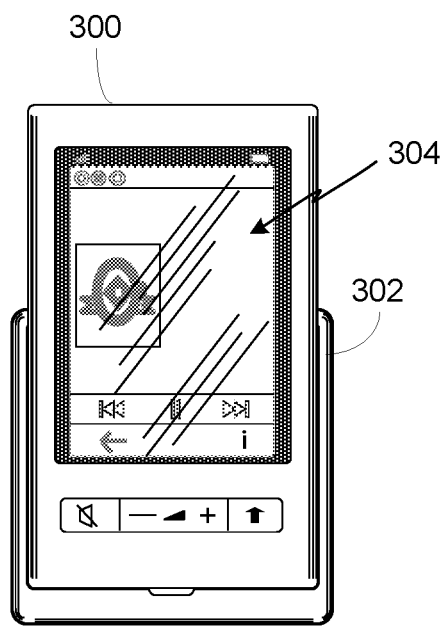
FIG. 3 shows an illustration of an example controller.

FIG. 3 illustrates an example wireless controller 300 in docking station 302. In some instances, wireless controller 300 may be in station mode while in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300. For example, touch screen 304 may enable the user to retrieve and navigate a playlist of audio items, modify and/or clear the playback queue of one or more zone players, control other operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless similar to that of wireless controller 300, wired to data network 128, or capable of both wireless and wired communication. It should be noted that wireless controller 300 may also be referred to as a master device, as part of a networked media system.

In some embodiments, if more than one controller is used in system 100 of FIG. 1, each controller may be coordinated to display common content. In some instances, one or more controllers may be dynamically updated to indicate changes made to the system 100 from a single controller, e.g., a master device. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, California include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

Zone players 102-124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network can be distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet. It should be noted that data network 128 may part of a networked media system.

In some embodiments, connecting any of the zone players 102-124, or some other connecting device, to a broadband router, can create data network 128. Other zone players 102-124 can then be added wired or wirelessly to the data network 128. For example, a zone player (e.g., any one of zone players 102-124) can be added to the system configuration 100 (or perform some other action) by simply pressing a button on the zone player itself, which enables a connection to be made to data network 128. The broadband router can be connected to an Internet Service Provider (ISP), for example. The broadband router can be used to form another data network within the system configuration 100, which can be used in other applications (e.g., web surfing or browsing).

Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

In some embodiments, data network 128 can be based on the 802.1d spanning tree protocol (STP). Utilizing the STP protocol, any interface in data network 128 may be classified as a bridge port. However, data network 128 may include proprietary enhancements to support meshing wireless interfaces, e.g., 2.4 GHz and 5 GHz. For example, rather than classifying an interface as a bridge port (as noted above for standard STP protocols), each zone player may be classified as a bridge port. Further, zone players 102-124 may classify ports as different points in a point-to-point (P2P) network. Yet further, zone players 102-124 may be able to utilize these points as entry points into the P2P data network 128. In particular, each of zone players 102-124 may maintain the MAC address of one or more other zone players (e.g., peer playback devices) in data network 128. For communicating amongst zone players, traffic flowing through these points is encapsulated in a P2P header and is forwarded as unicast frames.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given or labeled with a specific name (e.g., "Kitchen"), all of which may be programmable with controller 130. Moreover, in some embodiments, zone configurations may be dynamically changed even after being configured using controller 130 or some other mechanism.

In some embodiments, a "bonded zone" contains two or more zone players, such as the two zone players 106 and 108 in the family room, whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired zone players (also referred to as "bonded zone players") can play audio in synchrony with other zone players in the same or different zones.

According to some embodiments, zone players may be: grouped, consolidated, paired with other zone players, and/or separated from other zone players, for example, to obtain a desired configuration. The actions of grouping, consolidation, and pairing are preferably performed through a control interface, such as using controller 130, and not by physically connecting and re-connecting speaker wire to individual speakers for creating different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. It should be noted that playing audio in synchrony can refer to playback between zones, allowing an individual to pass through zones while seamlessly (or substantially seamlessly) listening to the audio.

For example, considering the scenario above, the individual on the patio may go inside the house in the middle of a jazz track. For instance, the individual may leave the patio at a time of 1:54 in the jazz track, i.e., the track has been playing for one minute and fifty-four seconds from the beginning of the track. Despite taking time, e.g., a few minutes, for the individual to walk from the patio to the office, zone player 102 may begin playing the jazz track at 1:54 as the individual enters the office. As such, the individual is able to listen to the entire jazz track regardless of where he/she is located in the house. In further examples, zones can be put into a "party mode" such that all associated zones will play audio in synchrony. It should be noted that playing audio in synchrony may also refer to zone players continuously and simultaneously playing audio regardless of where individuals are in the house.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as Airplay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
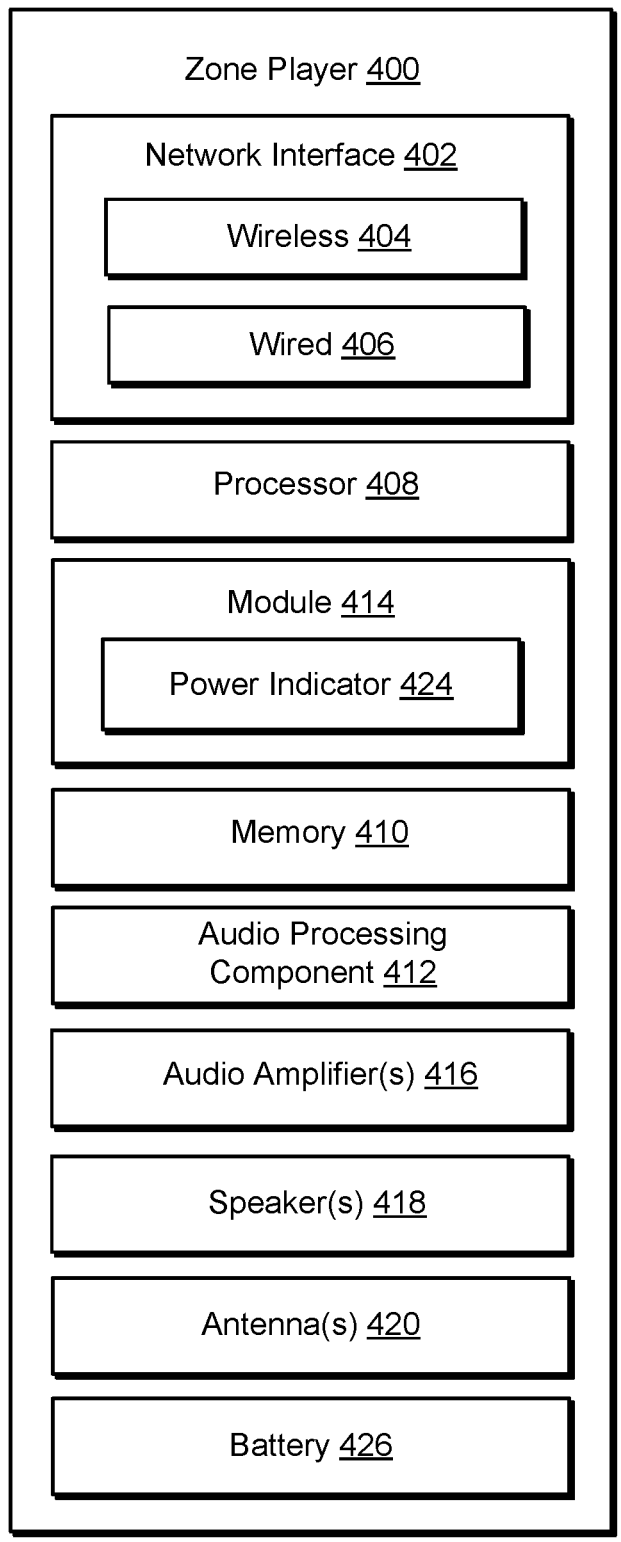
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, and one or more device modules 414 that include a power indicator module 424. Further, zone player 400 includes an audio amplifier 416 and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 can be a clock-driven electronic device that is configured to process input data according to instructions stored in memory 410. The memory 410 is data storage that can be loaded with one or more software modules 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

In some embodiments, one or more power indicator module(s) 424 may be executed by the processor 408 to determine a power source for zone player 400. In some instances, power indicator 424 may identify that zone player 400 is powered by an alternating current (AC) power supply, e.g., a power outlet, possibly while zone player 400 is in a station mode and docked on a station. Further, in some instances, zone player 400 may be a powered by a direct current (DC) power supply, e.g., a battery 426. Yet further, power indicator 424 may identify the level of power in battery 426 of zone player 400. It should be noted that various embodiments herein may facilitate the conservation of battery power, for example, the power in battery 426. Yet, it should further be understood that such embodiments may also facilitate the conservation of energy, for example, if zone player 400 is powered by an AC power supply through a power outlet.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
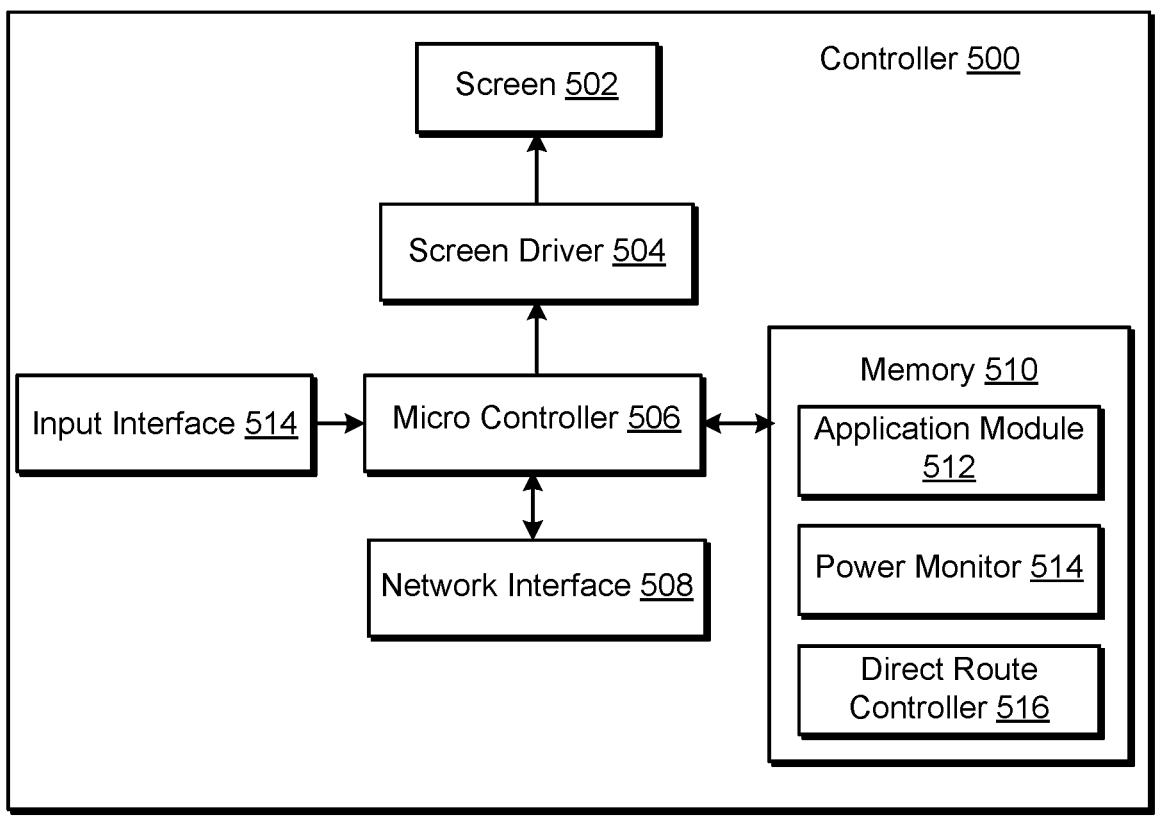
FIG. 5 shows an internal functional block diagram of an example controller.

Referring now to FIG. 5, there is shown an example block diagram for controller 500, which can correspond to the controlling device 130 in FIG. 1 and/or wireless controller 300. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display. It should be noted that controller 500.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 502 communicates with and is commanded by a screen driver 504 that is controlled by a microcontroller (e.g., a processor) 506. The memory 510 can be loaded with one or more modules, e.g., application module 512, power monitor module 514, and direct route controller module 516. These modules can be executed by the microcontroller 506 with or without a user input via the user interface 514 to achieve certain tasks. In some embodiments, an application module 512 can be configured to facilitate grouping a number of selected zone players into a zone group to facilitate synchronized playback amongst the zone players in the zone group. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be combined with a zone player, integrated into a zone player, and/or one or more zone players can be integrated into a controller, among other possibilities.

It should be noted that other network-enabled devices such as an iPhone™, iPad™ or any other smart phone or network-enabled device (e.g., a networked computer such as a PC or Mac™) can also be used as a controller to interact with or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to be association with the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a "family room+ dining room" playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
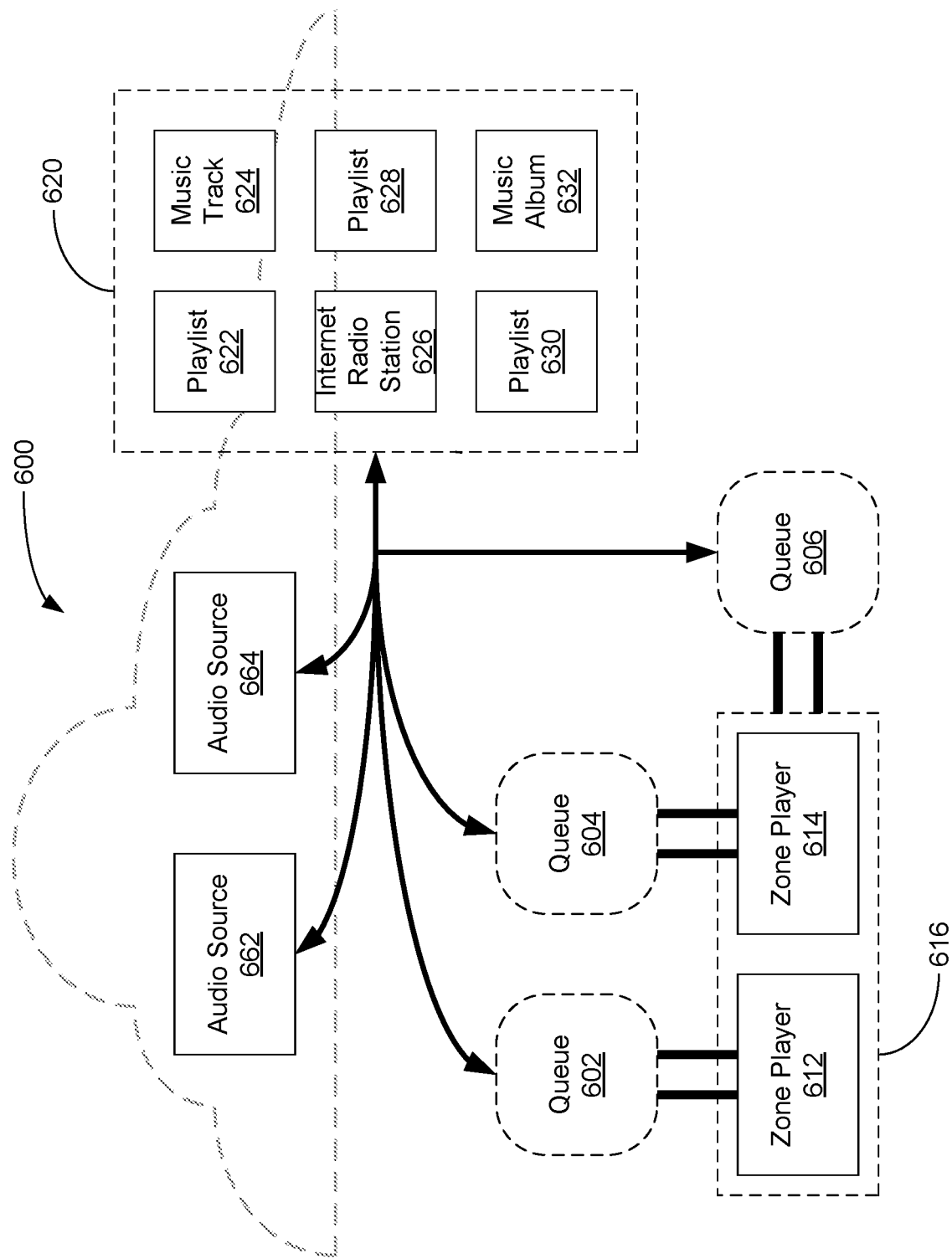
FIG. 6 shows an example playback queue configuration for an example network media system.

By way of illustration, FIG. 6 shows an example network media system 600 for media content playback. As shown, the example media system network 600 includes example zone players 612 and 614, example audio sources 662 and 664, and example media items 620. The example media items 620 may include playlist 622, music track 624, Internet radio station 626, playlists 628 and 630, and album 632. In one embodiment, the zone players 612 and 614 may be any of the zone players shown in FIGS. 1, 2A-C, and 4. For instance, zone players 612 and 614 may be the zone players 106 and 108, respectively, in the Family Room of FIG. 1.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or may exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents may be stored as a playlist. Further, at a given point in time within a playback queue, such contents may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
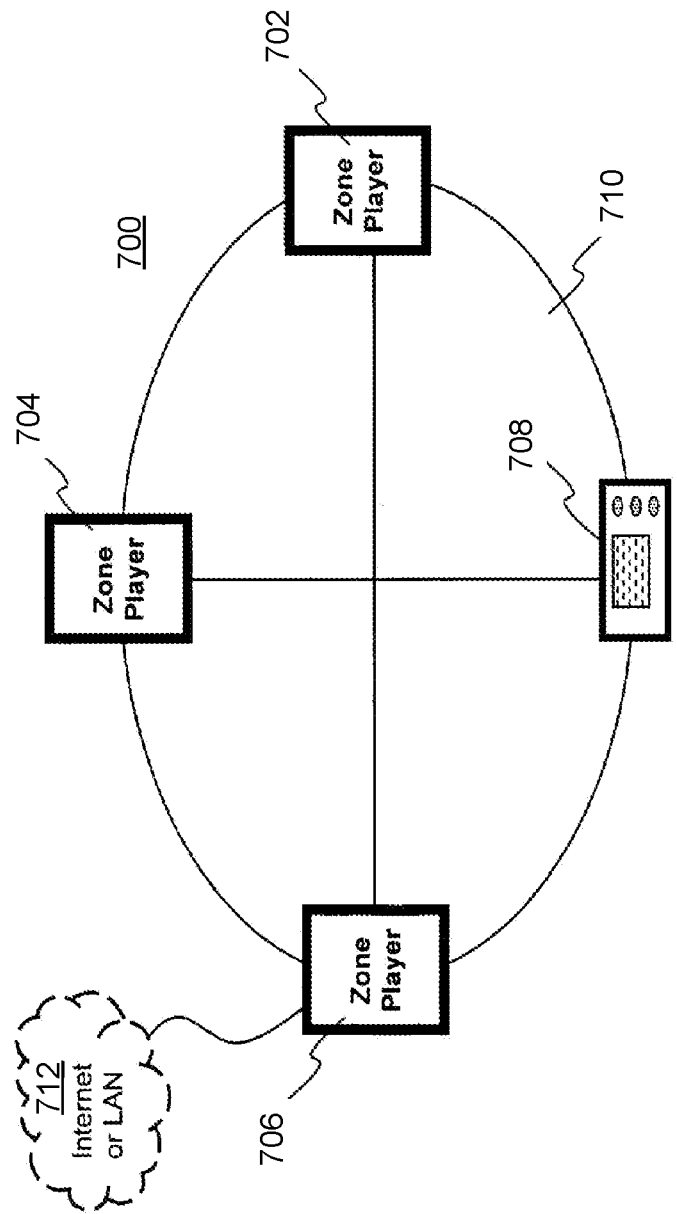
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other through direct point-to-point communication routes (e.g., in a "peer-to-peer" style of communication), for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network. It should be noted that networked media systems described herein may include Ad-Hoc networks such as Ad-Hoc network 710.

Using the Ad-Hoc network 710, the devices 702, 704, 706, and 708 can share or exchange one or more audio sources and can be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD can include two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments, each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
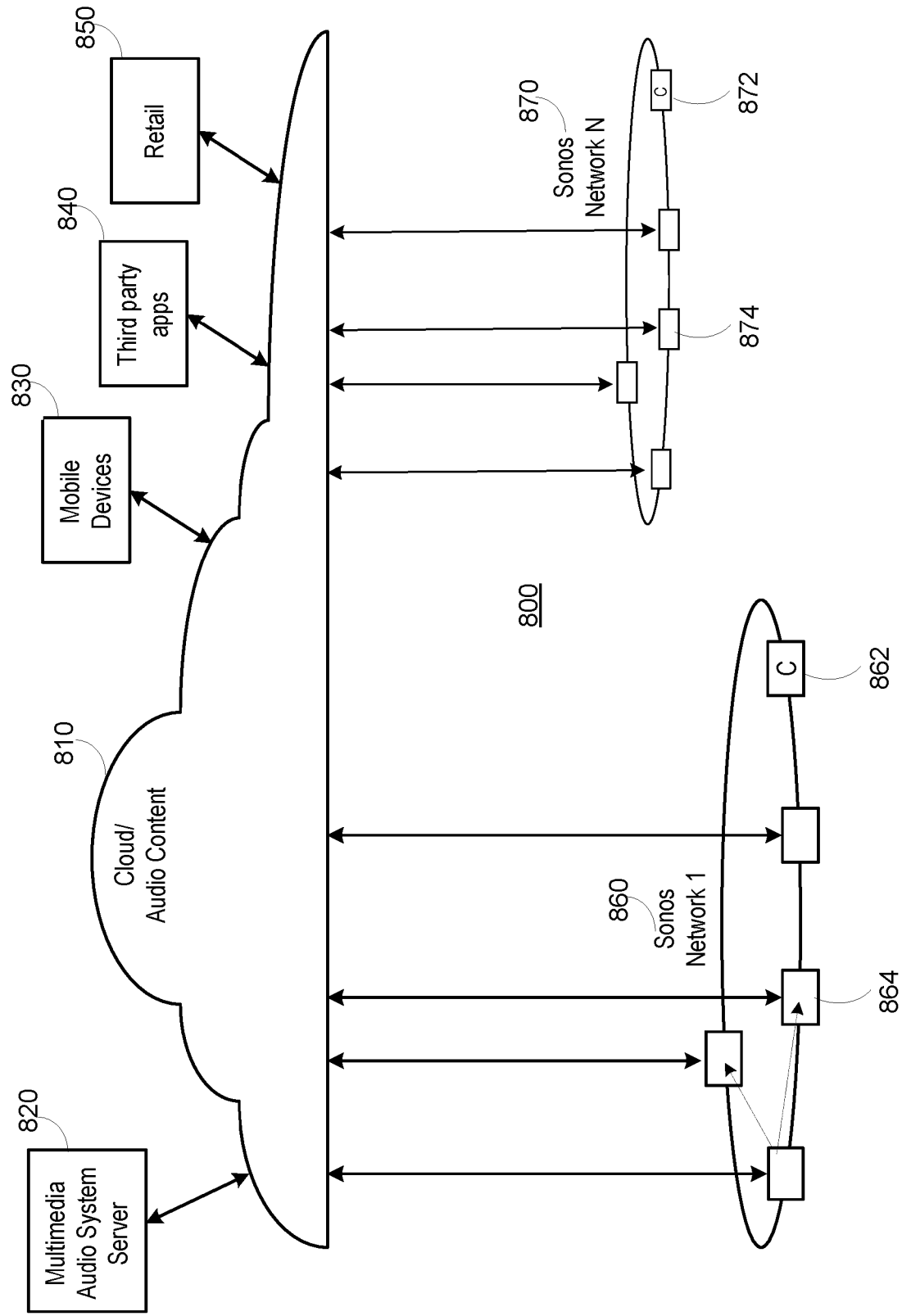
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™) a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Utilizing Direct and Non-Direct Routes Based on Low Power Operation

As described above, embodiments described herein involve communication routes between playback devices of a networked media system. Further, as noted above, the network media system may be configured to utilize direct communication routes (such as communication routes configured using a spanning tree protocol (STP)) and/or non-direct communication routes (such as a point-to-point communication route). Yet further, such direct routes and non-direct routes may be utilized in accordance with various types of device modes, such as a low power mode.

Figure 9:
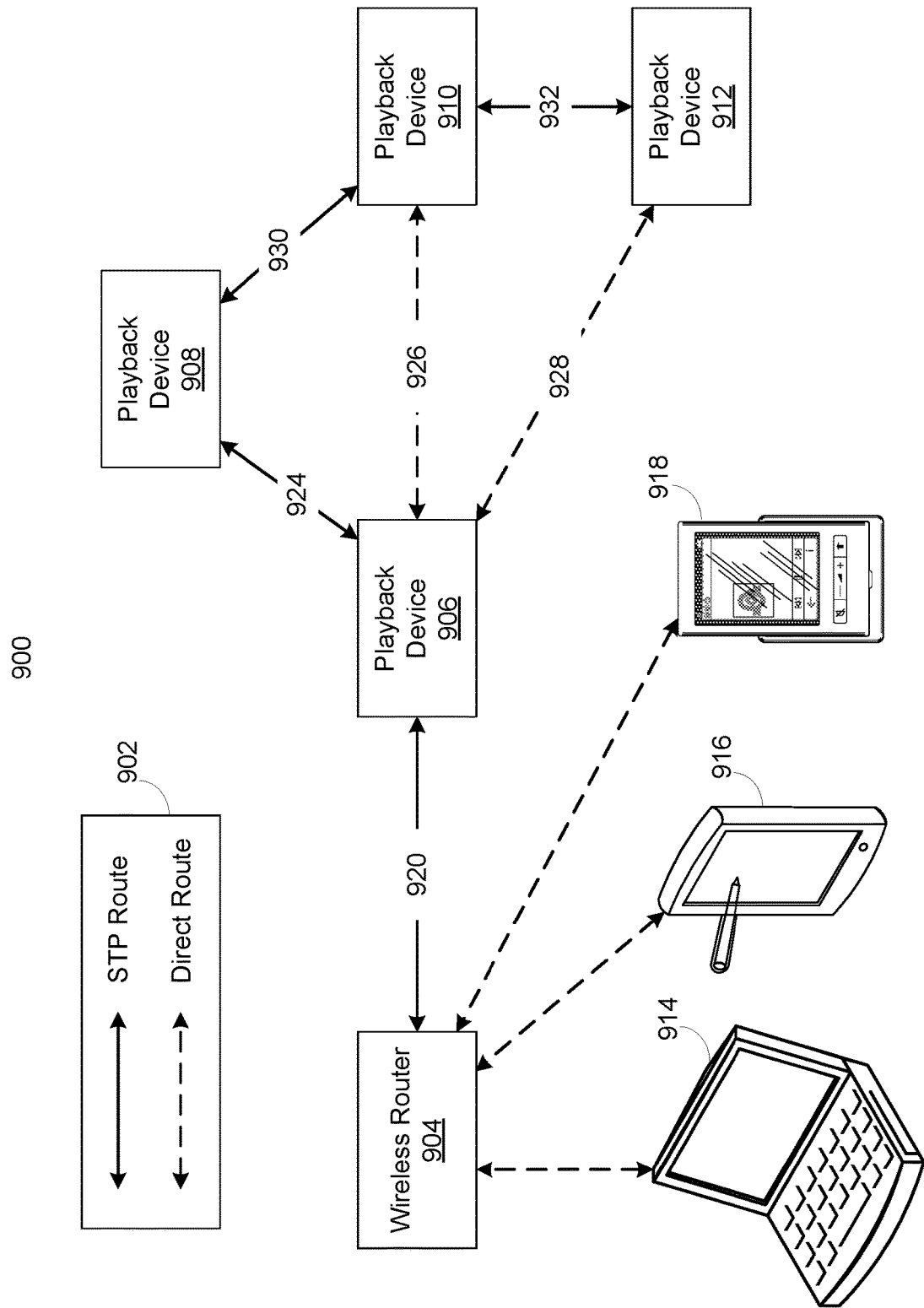
FIG. 9 shows example playback devices and example controllers as part of an example networked media system.

FIG. 9 shows an example networked media system. The networked media system 900 includes direct routes (e.g., point-to-point routes) and non-direct routes (e.g., spanning tree protocol (STP) routes). As designated in legend 902, direct routes are illustrated by dashed lines and STP routes are illustrated by solid lines. Further, networked media system 900 includes wireless router 904 that is directly routed to computer 914 and tablet 916. Yet further, networked media system 900 may utilize a mesh networking topology to place playback devices 906, 908, 910, and 912 in communication with each other using both STP routes and direct routes. For purposes of illustration, STP routes in networked media system 1000 are identified by STP links 920, 924, 930, and 932. For example, playback device 906 is routed to wireless router 904 and playback device 908 via STP links 920 and 924, respectively. As another example, playback device 910 is routed to playback devices 908 and 912 via STP links 930 and 932, respectively.

The example networked media system 900 also includes direct routes 926 and 928, among other (non-enumerated) direct routes. For example, playback device 912 is directly routed to playback device 906 via direct link 928. Further, playback device 910 is directly routed to playback device 906 via direct link 926. Although not shown, other direct links may exist as well. For example, playback device 912 could be directly routed to playback device 908, among other possibilities.

Playback devices 906, 908, 910, and 912 can be controlled using one or more controllers such as computer 914, tablet 916, and wireless controller 918. To facilitate discussion of method 1000 described below, playback device 912 may be referred to herein as a first playback device. Further, any one of playback devices 906, 908, and 910 may be referred to as at least one additional playback device. Yet further, a controller device, such as any one of computer 914, tablet 916, and wireless controller 918, may also include a playback device that may be referred to herein as a third playback device.

Figure 10:
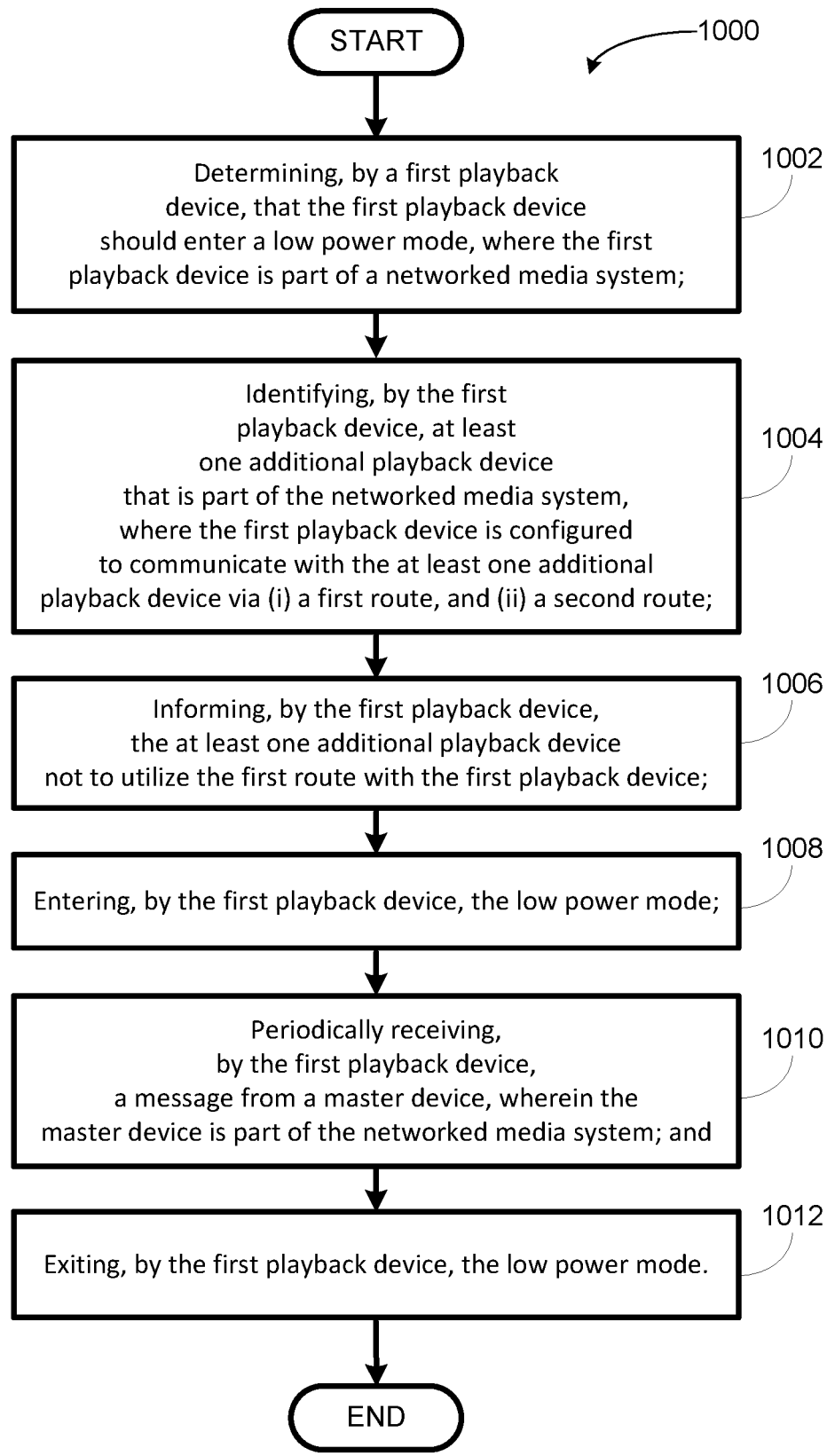
FIG. 10 shows an example flow diagram for intelligently utilizing communication routes based on low power operation.

FIG. 10 shows an example flow diagram for intelligently utilizing communication routes based low power operation, in accordance with at least some embodiments described herein. Method 1000 shown in FIG. 10 presents an embodiment of a method that could be used in environments 100, 600, 700, 800, 900 and 1200, and possibly in association with systems 200, 202, 204, 300, 400, and 500, for example, for communication with one or more playback devices.

As a general matter, each of blocks 1002-1012 may be carried out by one or more playback devices. Playback devices may include any one or more of zone players 102-124 of FIG. 1. Further, playback devices may include any one or more of zone players 200, 202, and 204 of FIGS. 2A, 2B, and 2C, respectfully. Yet further, playback devices may include any one or more of zone players 400 of FIG. 4 and zone players 612 and 614 of FIG. 6. In addition, playback devices may also include any one or more of zone players 702-706 of FIG. 7 and/or playback devices 864 and 874 of FIG. 8. In some instances, playback devices may include wireless controller 300, controller 500, and wireless controller 918 of FIGS. 3, 5, and 9, respectively. In addition, playback devices may include playback devices 906-912 of FIG. 9, and possibly computer 914 and tablet 916. Other possibilities may also exist. It should be understood that playback devices may be described herein as a "first playback device", a "second playback device", "at least one additional playback device", and/or "a third playback device" to distinguish one playback device from another.

Method 1000 may include one or more operations, functions, or actions as illustrated by one or more of blocks 1002-1012. Although the blocks are illustrated in sequential order, these blocks may also be performed in parallel, and/or in a different order than those described herein. Also, the various blocks may be combined into fewer blocks, divided into additional blocks, and/or removed based upon a desired implementation. It should also be noted that a first playback device may perform one or more of blocks 1002-1012 and the first playback device may instruct another playback device to perform the other blocks of 1002-1012, among other possibilities.

In addition, for the method 1000 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 1000 and other processes and methods disclosed herein, each block in FIG. 9 may represent circuitry that is wired to perform the specific logical functions in the process.

At block 1002, the method 1000 may involve determining, by a first playback device that is part of a networked media system, that the first playback device should enter a low power mode. As described above, a first playback device may be powered by a battery. For example, referring back to FIG. 4, zone player 400 may be powered by battery 426. Further, power indicator module 424 may be executed by processor 408 to determine the level of power remaining in battery 426 at various points in time. In some instances, power indicator module 424 may provide information corresponding to an amount of time left before the power remaining in battery 426 is estimated to run out, possibly based on the device mode of zone player 400 and/or the ports used by zone player 400 to communicate with other zone players.

In some embodiments, the first playback device may be configured to enter various device modes. As a general matter, a device mode may be indicative of a state of the playback device, in accordance with its functionality and/or configuration at a given point in time. For example, the first playback device may be configured to enter a low power mode. Such low power modes may include standby mode, fallback mode, sleep mode, snooze mode, hibernation mode, power down mode, and/or travel mode (e.g., airplane mode), among other possibilities. It should be understood that although the method 1000 is described with respect to a low power mode, it could be utilized for other device modes as well.

As noted above, zone player 400 may include power indicator module 424 that may be executed by processor 408. In some instances, based on executing power indicator module 424, processor 408 may change the device mode of zone player 400 from one device mode (e.g., station mode, normal-operating mode, and speed mode) to different device mode (e.g., low power mode).

In some embodiments, the first playback device may be configured to determine that it should enter a low power mode. For example, power indicator module 424 of zone player 400 may indicate that the level of remaining power in battery 426 is less than or equal to a threshold level of power. As such, zone player 400 may determine that it should enter a low power mode to conserve the power remaining in battery 426.

In some instances, the first playback device may determine that it should enter the low power mode after not playing audio content for a specified period of time, possibly a threshold period of time. For example, zone player 400 may enter the low power mode after five minutes of not playing audio content or some other period of time that may be specified by a given user. As another example, the first playback device may determine that it should enter the low power mode if it is not providing audio content to another playback device. It should be understood that a combination of the thresholds described above (or other thresholds not expressly provided) may also be implemented. For example, zone player 400 may determine that it should enter the low power mode when (i) the level of remaining power in battery 426 is less than or equal to a threshold level of power, (ii) zone player 400 is not playing back audio content, and (iii) zone player 400 is not providing audio content to another zone player. Other possibilities and/or combinations are possible as well.

Based on the determination at block 1002, the method 1000 at block 1004 may involve identifying, by the first playback device, at least one additional playback device that is part of the networked media system, where the first playback device is configured to communicate with the at least one additional playback device via (i) a first route, and (ii) a second route. For example, referring back to FIG. 9, playback device 912 (e.g., the first playback device) may identify playback device 906 of networked media system 900. As such, playback device 912 may be able to communicate with playback device 906 via a first route. The first route may be a direct point-to-point route, such as direct route 928. The second route may be a non-direct communication route. For example, playback device 912 may communicate with playback device 906 using a second, non-direct route via playback devices 910 and 908. This second, non-direct route may utilize STP links 932, 930, and 924.

At block 1006, the method 1000 may involve informing, by the first playback device, at least one additional playback device not to utilize the first route with the first playback device. For example, considering one or more scenarios of FIG. 9 above, playback device 912 may determine that it should enter the low power mode. As such, playback device 912 may inform playback device 906 not to utilize direct route 928 to communicate with playback device 912. Thus, playback device 906 may be limited to utilizing STP links 924, 930 and 932 to communicate with playback device 912, while utilizing playback devices 908 and 910 as intermediary devices. In some embodiments, playback device 912 may receive a confirmation or an answer from playback device 906 that playback device 906 will not utilize direct route 928 to communicate with playback device 912.

In a further example, as part of informing the at least one additional playback device not to utilize the first route with the first playback device, the first playback device may inform the at least one additional playback device to avoid routing communication through the first playback device, if possible. For example, if there are devices connected to the first playback device that are reachable by routes other than via the first playback device, then those routes should be used.

At block 1008, the method 1000 may involve entering, by the first playback device, the low power mode. For example, considering one or more scenarios of FIG. 9 above, playback device 912 may enter the low power mode.

Referring back to FIG. 4, for an example of entering the low power mode, processor 408 may execute one or more modules 414. In particular, processor 408 may execute power indicator module 424 such that zone player 400 enters the low power mode. Entering the low power mode may allow zone player 400 to conserve the remaining power left in battery 426. In some instances, the low power mode may also disable and/or suspend power for various components such as audio processing component 412, audio amplifier(s) 416, and/or speaker(s) 418.

FIG. 11A shows an illustration of an example bridge table entry and FIG. 11B shows an illustration of an example bridge table entry based on low power operation. For example, bridge table entry 1102 may be periodically updated by playback device 912, possibly based on a clock or a timer. As illustrated in FIG. 11A, prior to playback device 912 entering the low power mode, bridge table entry 1102 includes port IDs designated as Port_928 and Port_932 for communicating with each of the respective playback devices 906 and 910 in FIG. 9.

Further, bridge table entry 1102 includes MAC addresses designated as Playback_906 and Playback_910 for each of the respective playback devices 906 and 910 in FIG. 9. It should be understood that as a general matter, a MAC address may include a 48-bit address space unique to each playback device, but nonetheless, the representation of MAC addresses in FIGS. 11A-E are provided for simplicity and illustrative purposes. Yet further, bridge table entry 1102 includes at least one route type including, but not limited to, STP protocol and/or direct routing for each port. Yet further, bridge table entry 1102 may designate port types as point-to-point (P2P) wireless ports or wired ports, among other possibilities.

As illustrated in FIG. 11B, after entering the low power mode, bridge table entry 1104 includes the port ID of Port_932 but other Port IDs, such as Port_928, may no longer be present. Further, bridge table entry 1104 includes the MAC address of Playback_910, but other MAC addresses, such as Playback_906, may no longer be present. By omitting such data in bridge table entry 1104, playback device 912 does not update the information for various devices (e.g., playback device 906) while in low power mode. As opposed to probing for additional playback devices, as possibly done while operating in station mode or normal operating mode, playback device 912 may instead disable its probing to conserve power and energy in low power mode. Yet further, playback device 912 may not need to maintain network properties associated with wireless connectivity, e.g., authentication levels, data encryption, and signal quality, among other activities that may consume power and energy. In some instances, playback device 912 may only maintain the information of playback device 910 in bridge table 1104 to synchronize with playback device 910 when exiting the low power mode.

FIG. 11C shows an illustration of another example bridge table entry and FIG. 11D shows an illustration of another example bridge table entry based on low power operation. For example, bridge table entry 1106 may be periodically updated by playback device 906, possibly based on a clock or a timer. As illustrated in FIG. 11C, prior to playback device 906 entering the low power mode, bridge table entry 1106 includes port IDs designated Port_924, Port_926, and Port_928 for communicating with each of the respective playback devices 908, 910, and 912 in FIG. 9. Yet further, bridge table entry 1106 includes the port ID of Port_920 for communicating with the wireless router 904. In this example embodiment, playback device 906 may be connected to wireless router 904 via wired connection 920 (possibly a wired Ethernet connection) and a MAC address may not be recorded for wired connections. In other example embodiments, a MAC address may be recorded for wired connections.

Further, bridge table entry 1106 includes MAC addresses designated as Playback_908, Playback_910, and Playback_912 for each of the respective playback devices 908, 910, and 912 in FIG. 9. Yet further, bridge table entry 1106 includes at least one route type including, but not limited to, an STP protocol and/or direct routing for each port. Yet further, bridge table entry 1106 may designate port types as point-to-point (P2P) wireless communication ports and/or wired ports, among other possibilities.

As illustrated in FIG. 11D, after playback device 906 enters the low power mode, bridge table entry 1108 includes the port IDs of Port_924 and Port_920, but other Port IDs, such as Port_926 and Port_928, may no longer be present. Further, bridge table entry 1108 includes the MAC address of Playback_908, but other MAC addresses such as Playback_910 and Playback_912, may no longer be present. By omitting such data in bridge table entry 1108, playback device 906 does not update the information for various devices (e.g., playback devices 910 and 912) while in low power mode. As opposed to probing for additional playback devices, as possibly done while operating in station mode or normal operating mode, playback device 906 may instead disable its probing to conserve power and energy in low power mode. Yet further, playback device 906 may not need to maintain network properties associated with wireless connectivity, e.g., authentication levels, data encryption, and signal quality, among other activities that may consume the power and energy. In some instances, playback device 906 may only maintain the information of playback device 908 and/or wireless router 904 in bridge table 1104 to synchronize with playback device 908 and/or wireless router 904 when exiting the low power mode.

Figure 12A:
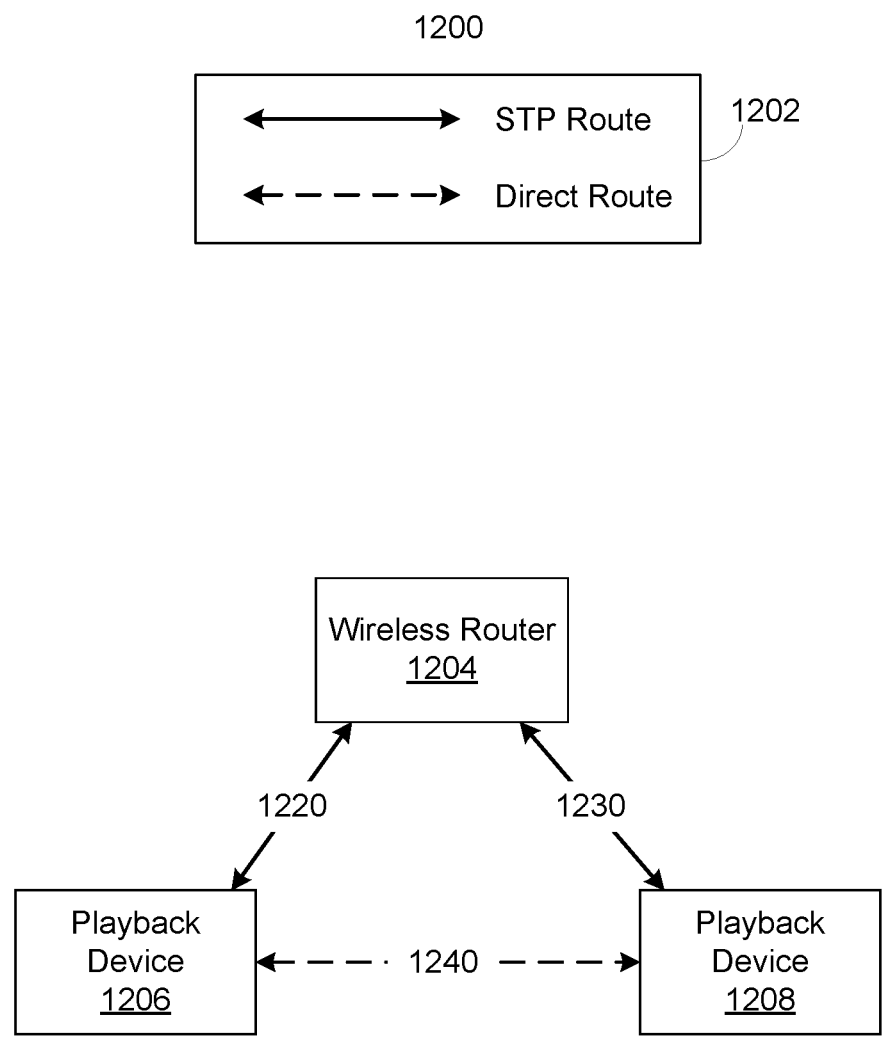
FIG. 12A shows additional example playback devices and an example router as part of another example networked media system.

FIG. 12A shows another example networked media system. The networked media system 1200 includes direct routes (e.g., point-to-point routes) and non-direct routes (e.g., spanning tree protocol (STP) routes). As designated in legend 1202, a direct route is illustrated by a dashed line and STP routes are illustrated in solid lines. Further, networked media system 1200 includes wireless router 1204 that is directly routed to playback devices 1206 and 1208. In this example embodiment, the wireless router 1204 is connected wirelessly to playback devices 1206 and 1208. In other embodiments, the wireless router 1204 may be connected wirelessly or via a wired technology (e.g., Ethernet) to playback devices 1206 and 1208. Yet further, networked media system 1200 may utilize a mesh networking topology to place playback devices 1206 and 1208 in communication with each other using direct route 1240. For purposes of illustration, playback device 1206 is routed to wireless router 1204 via STP link 1220. Further, playback device 1208 is routed to wireless router 1204 via STP link 1230. To facilitate discussion of method 1000 described herein, playback device 1206 may be referred to herein as a first playback device. Further, playback device 1208 may be referred to at least one additional playback device. Yet further, wireless router 1204 may also include a playback device that may be referred to herein as a third playback device.

FIG. 12B shows an illustration of yet another example bridge table entry and FIG. 12C shows an illustration of yet another example bridge table entry based on low power operation. For example, bridge table entry 1242 may be periodically updated by playback device 1206, possibly based on a clock or a timer. As illustrated in FIG. 11A, prior to playback device 1206 entering the low power mode, bridge table entry 1242 includes port IDs designated as Port_1220 and Port_1240 for communicating with wireless router 1204 and playback device 1208 in FIG. 12A, respectively.

Further, bridge table entry 1242 includes MAC addresses designated as wireless_1204 and Playback_1208 for wireless router 1204 and playback device 1208 in FIG. 12A, respectively. In this example, as opposed to one or more previous examples described, the MAC address assigned to the wireless router 1204 (Wireless_1204) may be recorded in the bridge table entry 1242 because the connection between the playback device 1206 and the wireless router 1204 is a wireless connection. As noted for FIGS. 11A-D, a MAC address may include a 48-bit address space unique to each playback device, but nonetheless, the representation of MAC addresses in FIGS. 12B and 12C are provided for simplicity and illustrative purposes. Yet further, bridge table entry 1242 includes at least one route type including, but not limited to, "access point" and/or direct routing for each port. Yet further, bridge table entry 1242 may designate port types as access point (AP) and/or point-to-point (P2P) wireless communication ports, among other possibilities.

As illustrated in FIG. 12B, after playback device 1206 enters the low power mode, bridge table entry 1244 includes the port ID of Port_1220 but Port_1240 may no longer be present. Further, bridge table entry 1244 includes the MAC address of Wireless_1204, but other MAC addresses, such as Playback_1208, may no longer be present. By omitting such data in bridge table entry 1244, playback device 1206 does not update the information for various devices (e.g., playback device 1208) while in low power mode. As opposed to probing for additional playback devices, as possibly done while operating in station mode or normal operating mode, playback device 1206 may instead disable its probing to conserve power and energy in low power mode. Yet further, playback device 1206 may not need to maintain network properties associated with wireless connectivity, e.g., authentication levels, data encryption, and signal quality, among other activities that may consume the power and energy. In some instances, playback device 1206 may only maintain the information of wireless router 1204 to synchronize with wireless router 1204 when exiting the low power mode.

At block 1010, the method 1000 may involve periodically receiving, by the first playback device, a message from a master device, where the master device is part of the networked media system. For example, considering one or more scenarios of FIG. 9 above, playback device 912 may enter the low power mode and may periodically receive a message from a master device, such as playback device 906. Generally, the master device will be a playback device that is a parent node to the first playback device. As shown in FIG. 9, playback devices 906, 908, and 910 may all be parent nodes to playback device 912. As such, any of these devices could serve as master devices. In one embodiment, a master device could be the playback device farthest up the spanning tree, e.g., playback device 906 that is routed to wireless router 904. In another embodiment, a master device could be the playback device immediately up the spanning tree, e.g., playback devices 906, 908 and/or 910. Other embodiments are possible as well. In some embodiments, a master device can also be configured to send commands that cause one or more playback devices in low power mode to exit the low power mode, possibly to enter another device mode.

In some instances, the master node (in this example playback device 906) may communicate with each of playback devices 908, 910, and 912 to determine and/or monitor the power level of each respective playback device. For example, playback device 912 may determine that its power level has dropped under a threshold level of power. As such, playback device 912 may enter low power mode and thus no longer utilize direct route 928. However, playback device 912 may be recharged, possibly by a user, to increase its power level above the threshold level of power. If the master device is monitoring the level of power of playback device 912, it could instruct playback device 912 to exit the low power mode, possibly to enter normal operating modes. As another example, playback device 912 could be configured to automatically exit the lower power mode upon reaching a threshold level of power.

In some embodiments, as noted above, playback devices may maintain the identification of a master device or node to receive network information from the master device when exiting the low power mode. For example, playback device 912 may go into low power mode such and playback device 912 may include bridge table entry 1104, as shown in FIG. 11B. Further, playback device 912 may receive a wake-on-wireless (WOW) message from playback device 906, possibly a master device. In response, playback device 912 may update its bridge table entry 1104 using the data provided in the WOW message. Thus, playback device 912 may again obtain the data shown in bridge table entry 1102.

At block 1012, the method 1000 may involve exiting, by the first playback device, the low power mode. For example, considering one or more scenarios of FIG. 9 above, playback device 912 may exit the low power mode. In some instances, playback device 912 may exit the low power mode and enter one or more normal operating modes.

In some embodiments, based on exiting the lower power mode, the first playback device may inform at least one additional playback device to reutilize the first route (i.e., direct route) with the first playback device. For example, considering one or more scenarios of FIG. 9 above, playback device 912 may exit the low power mode and inform playback device 906 to reutilize direct route 928.

Further, considering one or more scenarios of FIG. 9 above, playback device 912 may enter a low power mode and subsequently recharge its batteries above a threshold level of power. As such, playback devices 912 may exit the low power mode. As noted above, a master device, such as playback device 906, may monitor the power levels of one or more playback devices and send messages to playback device 912 to exit the low power mode. In some instances, the master device may send one or more messages to playback device 912 to enable direct route 928. As such, playback devices 912 may reutilize direct route 928. Further, playback device 912 may update its bridge table entry 1104 using the data provided by the master device. Thus, playback device 912 may again obtain the data shown in bridge table entry 1102.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As described above, embodiments described herein involve communication routes between playback devices of a networked media system. Further, as noted above, an example network media system may be configured with direct communication routes and/or non-direct communication routes, in accordance with the spanning tree protocol (STP). Yet further, such direct routes and non-direct routes may be utilized in accordance with various types of device modes, such as a low power mode.

In one aspect, a method is provided. The method involves determining, by a first playback device, that the first playback device should enter a low power mode, where the first playback device is part of a networked media system. Based on this determination, the method further involves identifying, by the first playback device, at least one additional playback device that is part of the networked media system, where the first playback device is configured to communicate with the at least one additional playback device via (i) a first route, and (ii) a second route. Further, the method involves informing, by the first playback device, the at least one additional playback device not to utilize the first route with the first playback device. Yet further, the method involves entering, by the first playback device, the low power mode. While the first playback device is in the low power mode, the method further involves periodically receiving, by the first playback device, a message from a master device, where the master device is part of the networked media system. Based on the message, the method involves exiting, by the first playback device, the low power mode.

In another aspect, a playback device is provided. The playback device includes a processor, a network interface, a non-transitory computer-readable storage medium, and program logic stored on the non-transitory computer-readable medium. The program logic is executable by the processor to determine that the playback device should enter a low power mode, where the playback device is part of a networked media system. Based on the determination, the program logic is further executable by the processor to identify at least one additional playback device that is part of the networked media system, where the playback device is configured to communicate with the at least one additional playback device via (i) a first route, and (ii) a second route. The program logic is further executable by the processor to inform the at least one additional playback device not to utilize the first route with the playback device. Yet further, the program logic is executable by the processor to enter the low power mode. While the first playback device is in the low power mode, the program logic is further executable by the processor to periodically receive a message from a master device, where the master device is part of the networked media system. Based on the message, the program logic is further executable by the processor to exit the low power mode.

In yet another aspect, a non-transitory computer-readable storage medium is provided. The non-transitory computer-readable storage medium includes a set of instructions for execution by a processor. The set of instructions, when executed, cause a playback device to determine that the playback device should enter a low power mode, where the playback device is part of a networked media system. Based on the determination, the set of instructions, when executed, cause the playback device to identify at least one additional playback device that is part of the networked media system, where the playback device is configured to communicate with the at least one additional playback device via (i) a first route, and (ii) a second route. Further, the set of instructions, when executed, cause the playback device to inform the at least one additional playback device not to utilize the first route with the playback device. Further, the set of instructions, when executed, cause the playback device to enter the low power mode. While the first playback device is in the low power mode, the set of instructions, when executed, cause the playback device to periodically receive a message from a master device, where the master device is part of the networked media system. Based on the message, the set of instructions, when executed, cause the playback device to exit the low power mode.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A playback device comprising:
at least one communication interface;
one or more amplifiers configured to drive one or more audio transducers;
a battery configured to power the playback device;
at least one processor;
at least one non-transitory computer-readable medium comprising program instructions that are executable by the at least one processor such that the playback device is configured to:
while in a first mode of operation and connected to at least one data network, (i) maintain network information corresponding to one or more devices on the at least one data network, and (ii) after receipt of audio content via the at least one data network, play back the audio content in synchrony with another playback device using the one or more amplifiers;
transmit at least one message comprising an indication that the playback device is to transition from the first mode of operation to a second mode of operation where the playback device consumes less power than in the first mode of operation;
transition from the first mode of operation to the second mode of operation;
while in the second mode of operation, (i) forego maintenance of the network information in a network table, and (ii) detect receipt of at least one wake message;
after receipt of the at least one wake message, transition from the second mode of operation to the first mode of operation; and
after the transition from the second mode of operation to the first mode of operation, update the network information corresponding to the one or more devices on the at least one data network.

2. The playback device of claim 1, wherein the one or more devices on the at least one data network comprise at least one of: an access point, a router, a mobile device, or the other playback device.

3. The playback device of claim 1, wherein the network information comprises an internet protocol (IP) address or a media access control (MAC) address for at least one of the one or more devices.

4. The playback device of claim 1, wherein the audio content is received from at least one cloud server and wherein the at least one non-transitory computer-readable medium further comprises program instructions that are executable by the at least one processor such that the playback device is configured to:
while in the first mode of operation, transmit at least some of the audio content to the other playback device via the at least one data network.

5. The playback device of claim 1, wherein the audio content is received from the other playback device.

6. The playback device of claim 5, wherein the audio content is received from the other playback device via an in-direct route that comprises at least one intermediary device between the playback device and the other playback device.

7. The playback device of claim 6, wherein the at least one intermediary device comprises at least one of: an access point or a router.

8. The playback device of claim 1, wherein the program instructions that are executable by the at least one processor such that the playback device is configured to detect receipt of the at least one wake message comprises program instructions that are executable by the at least one processor such that the playback device is configured to:
detect receipt of the at least one wake message from a mobile device.

9. The playback device of claim 1, wherein the program instructions that are executable by the at least one processor such that the playback device is configured to detect receipt of the at least one wake message comprises program instructions that are executable by the at least one processor such that the playback device is configured to:
detect receipt of the at least one wake message from the other playback device.

10. A method of operating a playback device comprising:
while in a first mode of operation and connected to at least one data network, (i) maintaining network information corresponding to one or more devices on the at least one data network, (ii) receiving audio content via the at least one data network, and (iii) playing back the audio content in synchrony with another playback device using one or more amplifiers of the playback device;
transmitting at least one message comprising an indication that the playback device is to transition from the first mode of operation to a second mode of operation where the playback device consumes less power than in the first mode of operation;

transitioning from the first mode of operation to the second mode of operation;

while in the second mode of operation, (i) foregoing maintenance of the network information in a network table, and (ii) detecting receipt of at least one wake message;

after receiving the at least one wake message, transitioning from the second mode of operation to the first mode of operation; and after transitioning from the second mode of operation to the first mode of operation, updating the network information corresponding to the one or more devices on the at least one data network.

11. The method of claim 10, wherein maintaining the network information corresponding to the one or more devices on the at least one data network comprises maintaining network information corresponding to at least one of: an access point, a router, a mobile device, or the other playback device.

12. The method of claim 10, wherein maintaining the network information corresponding to the one or more devices on the at least one data network comprises maintaining at least one of an internet protocol (IP) address or a media access control (MAC) address for at least one of the one or more devices.

13. The method of claim 10, wherein receiving the audio content comprises receiving the audio content from at least one cloud server and wherein the method further comprises:

transmitting, via the at least one data network, at least some of the audio content to the other playback device.

14. The method of claim 10, wherein receiving the audio content comprises receiving the audio content from the other playback device via the at least one data network.

15. The method of claim 14, wherein receiving the audio content from the other playback device comprises receiving the audio content from the other playback device via an in-direct route that comprises at least one intermediary device between the playback device and the other playback device.

16. The method of claim 15, wherein receiving the audio content from the other playback device via the in-direct route comprises receiving the audio content from the other playback device via at least one of: an access point or a router.

17. The method of claim 10, wherein detecting receipt of the at least one wake message comprises:

detecting receipt of the at least one wake message from a mobile device.

18. The playback device of claim 10, wherein detecting receipt of the at least one wake message comprises:

detecting receipt of the at least one wake message from the other playback device.

19. At least one non-transitory computer-readable medium comprising program instructions that are executable by at least one processor such that a playback device is configured to:

while in a first mode of operation and connected to at least one data network, (i) maintain network information corresponding to one or more devices on the at least one data network, and (ii) after receipt of audio content via the at least one data network, play back the audio content in synchrony with another playback device using one or more amplifiers of the playback device;

transmit at least one message comprising an indication that the playback device is to transition from the first mode of operation to a second mode of operation where the playback device consumes less power than in the first mode of operation;

transition from the first mode of operation to the second mode of operation;

while in the second mode of operation, (i) forego maintenance of the network information in a network table, and (ii) detect receipt of at least one wake message;

after receipt of the at least one wake message, transition from the second mode of operation to the first mode of operation; and after the transition from the second mode of operation to the first mode of operation, update the network information corresponding to the one or more devices on the at least one data network.

\* \* \* \* \*